(12) United States Patent
Kim et al.

(10) Patent No.: US 11,982,782 B2
(45) Date of Patent: May 14, 2024

(54) METHOD AND DEVICE FOR ANALYZING 3D TARGET MANEUVER USING LINE ARRAY SENSOR

(71) Applicant: AGENCY FOR DEFENSE DEVELOPMENT, Daejeon (KR)

(72) Inventors: Woochan Kim, Daejeon (KR); Taeil Suh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/045,055

(22) Filed: Oct. 7, 2022

(65) Prior Publication Data
US 2023/0408721 A1 Dec. 21, 2023

(30) Foreign Application Priority Data
Jun. 20, 2022 (KR) .......................... 10-2022-0074699

(51) Int. Cl.
*G01V 11/00* (2006.01)
(52) U.S. Cl.
CPC .................... *G01V 11/00* (2013.01)
(58) Field of Classification Search
CPC ...................................................... G01V 11/00
See application file for complete search history.

(56) References Cited

U.S. PATENT DOCUMENTS

| 9,383,429 B2 * | 7/2016 | May | ...................... G01S 5/0242 |
| 2016/0061932 A1 | 3/2016 | May | |

FOREIGN PATENT DOCUMENTS

KR    102547420 B1 *    6/2023    ........... G01S 5/0294

OTHER PUBLICATIONS

Machine Translation of KR 102547420 B1 to Woochan et al. (Year: 2023).*
Office Action in Korean Application No. 10-2022-0074699 dated Mar. 29, 2023.
Notice of Allowance dated Jun. 19, 2023 in Korean Application No. 10-2022-0074699.

* cited by examiner

*Primary Examiner* — Mischita L Henson
(74) *Attorney, Agent, or Firm* — Knobbe, Martens, Olson & Bear, LLP

(57) ABSTRACT

A three-dimensional target motion analysis method using a line array sensor performed by a three-dimensional target motion analysis apparatus is proposed. The method may include acquiring a first conic angle between a target and the three-dimensional target motion analysis apparatus from the line array sensor at a predetermined first time point. The method may also include acquiring first attitude information including an attitude angle, a position, and a depth of the three-dimensional target motion analysis apparatus at the first time point. The method may further include analyzing a three-dimensional motion of the target by estimating a three-dimensional position of the target at the first time point based on the first conic angle and the first attitude information.

14 Claims, 6 Drawing Sheets

METHOD AND DEVICE FOR ANALYZING 3D TARGET MANEUVER USING LINE ARRAY SENSOR

CROSS-REFERENCE TO RELATED APPLICATION

This application claims priorty to Korean Patent Application No. 10-2022-0074699 filed on Jun. 20, 2022. The entire contents of the application on which the priority is based are incorporated herein by reference.

TECHNICAL FIELD

The present disclosure relates to a method, an apparatus, a program, and a computer-readable recording medium storing the program for three-dimensional target motion analysis using a line array sensor.

BACKGROUND

Target Motion Analysis (TMA) is a technology for estimating the motion information (position, velocity, etc.) of a target by using the azimuth information, which is not given distance information, from a line array sensor of a ship.

SUMMARY

One aspect is a method, an apparatus, a program, and a computer-readable recording medium storing the program for three-dimensional target motion analysis using a line array sensor.

Another aspect is a three-dimensional target motion analysis method using a line array sensor performed by a three-dimensional target motion analysis apparatus. The method comprises, acquiring a first conic angle between a target and the three-dimensional target motion analysis apparatus from the line array sensor at a predetermined first time point; acquiring first attitude information including an attitude angle, a position, and a depth of the three-dimensional target motion analysis apparatus at the first time point; and analyzing a three-dimensional motion of the target by estimating a three-dimensional position of the target at the first time point based on the first conic angle and the first attitude information.

Herein, the analyzing of the three-dimensional motion of the target comprises: generating a plurality of first filters on a surface of a three-dimensional first region corresponding to the obtained first conic angle; with respect to the generated first filter, setting different state vectors indicating a position and a velocity of the first filter, and a covariance which is a region in which the first filter can detect the target, using the first attitude information; and estimating a first position, which is a position of the target at the first time point, based on the state vectors of the first filter.

Herein, the estimating of the first position comprises: estimating the first position with a Gaussian mixture with respect to the state vectors of the first filter.

The method further comprises, acquiring a second conic angle between the target and the three-dimensional target motion analysis apparatus from the line array sensor at a second time point after a predetermined time interval from the first time point; acquiring second attitude information of the three-dimensional target motion analysis apparatus at the second time point; and updating the motion of the target and the state vectors of the first filter based on the first position, the second conic angle and the second attitude information.

Herein, the updating of the state vectors of the first filter comprises: updating the state vectors by using the first position, the second conic angle and the second attitude information as inputs of a Kalman filter.

Herein, at the first time point, the covariance of the first filter is set to increase in size as a distance from the line array sensor increases.

Herein, the analyzing of the three-dimensional motion of the target comprises: calculating the first conic angle of the first filter based on the state vectors of the first filter; calculating a weight of the first filter based on the first filter, the estimated first position, and an innovation matrix of the first filter; updating the first position based on the calculated weight; and tracking the motion of the target based on the updated first position.

Herein, the calculating of the weight of the first filter comprises normalizing the weight.

The method further comprises, estimating the position of the target at a second time point that is after a first predetermined time interval from the first time point, which is performed after the analyzing of the three-dimensional motion of the target by estimating the three-dimensional position of the target; calculating a first estimated conic angle and a second estimated conic angle respectively, based on the first estimated position of the target at the first time point and the second position of the target at the second time point, or based on the first estimated position and the second estimated position input by a user; and determining an observability based on the first estimated conic angle and the second estimated conic angle.

Herein, the determining of the observability comprises: calculating an observability index based on the first estimated conic angle and the second estimated conic angle; and determining that there is the observability of the target if the observability index is equal to or greater than a predetermined value.

Another aspect is a three-dimensional target motion analysis apparatus using a line array sensor, comprising: a detection device configured to acquire a first conic angle between a target and the three-dimensional target motion analysis apparatus from the line array sensor at a predetermined first time point, and acquire first attitude information including an attitude angle, a position, and a depth of the three-dimensional target motion analysis apparatus at the first time point; and a controller configured to analyze a three-dimensional motion of the target by estimating a three-dimensional position of the target at the first time point based on the first conic angle and the first attitude information.

In accordance with still another aspect of the present disclosure, there is provided a non-transitory computer-readable storage medium including computer executable instructions, wherein the instructions, when executed by a processor, cause the processor to perform a three-dimensional target motion analysis method, the method comprising: acquiring a first conic angle between a target and the three-dimensional target motion analysis apparatus from the line array sensor at a predetermined first time point; acquiring first attitude information including an attitude angle, a position, and a depth of the three-dimensional target motion analysis apparatus at the first time point; and analyzing a three-dimensional motion of the target by estimating a three-dimensional position of the target at the first time point based on the first conic angle and the first attitude information.

Since the three-dimensional target motion analysis method according to an embodiment of the present disclosure can generate a plurality of filters to analyze and track the motion of the target in three-dimensions, the user can more accurately determine the position of the target. In addition, while analyzing the motion of the target in three-dimensions, it is possible to provide the observability of the target to enable the user to operate the ship according to the observability of the target.

DETAILED DESCRIPTION

In certain Target Motion Analysis technology, an azimuth Target Motion Analysis (Bearings-only TMA) is representative, and the azimuth Target Motion Analysis calculates the motion information of the target on a two-dimensional plane assuming that the target and the line array sensor (observer) are in the same depth.

Because the target motion analysis technology calculates the motion information of the target on a two-dimensional plane, it is impossible to estimate the three-dimensional motion target. Therefore, since there is no information on the depth, there is a problem in that there is a limit to plan a precise engagement between ships in a three-dimensional space.

Further, the target motion analysis technology has a problem in that there is a modeling error of the sensor. The target information detected by the line array sensor is a three-dimensional conic angle, and since the conic angle is determined as an azimuth angle, the estimation performance may be degraded by adding a potential target estimation error.

In addition, since the target motion analysis structure sequentially provides solutions even under non-observable conditions, the reliability of the target motion analysis solution is not guaranteed.

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
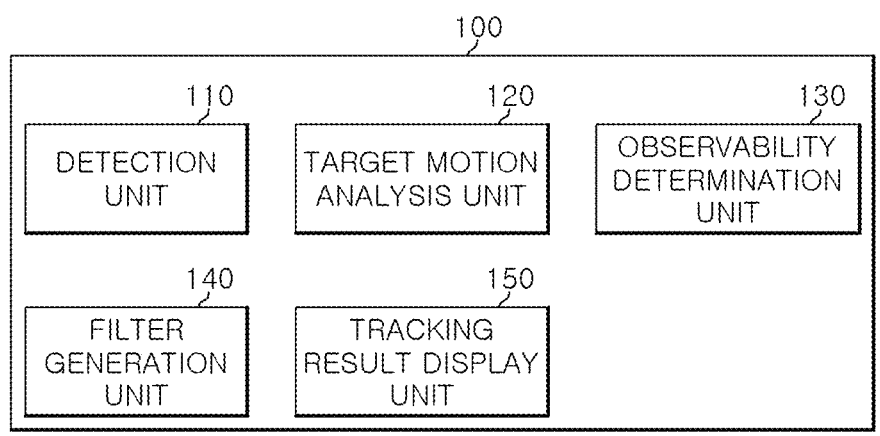
FIG. 1 is a block diagram illustrating a three-dimensional target motion analysis apparatus according to an embodiment of the present disclosure.

FIG. 1 is a block diagram illustrating a three-dimensional target motion analysis apparatus according to the embodiment of the present disclosure.

Referring to FIG. 1, the three-dimensional target motion analysis apparatus 100 may include a detection unit 110, a target motion analysis unit 120, an observability determination unit 130, a filter generation unit 140, and a tracking result display unit 150. However, the configuration of the three-dimensional target motion analysis apparatus 100 is not limited thereto and may be variously changed. For example, the three-dimensional target motion analysis apparatus 100 may include only the detection unit 110, the target motion analysis unit 120, and the filter generator 140.

The three-dimensional target motion analysis apparatus 100 according to the embodiment may generate a track that is motion information of the target by tracking the position of the detected target over time, and provide the three-dimensional motion analysis of the target using the track updated by accumulating measurement information by the track.

In addition, the three-dimensional target motion analysis apparatus 100 according to the embodiment may provide whether or not the target is observable by using state information of a plurality of filters for detecting the position of the detected target over time.

The detection unit 110 may detect attitude information including an attitude angle, a position, and a depth of the ship. Also, the detection unit 110 may detect a conic angle between the target and the detection unit.

Here, the detection unit 110 may be a line array sensor. For example, the detection unit 110 may be a Towed Array Sonar (TAS) or a Flack Array Sonar (FAS).

The towed array sonar refers to a low-frequency passive sonar system capable of detecting, identifying and tracking enemy submarines in early stages. In addition, the towed array sonar can be applied with advanced information processing technology, such as precision signal processing technology for long-range detection of submarines that are being reduced in noise, separate tracking of individual signals, and target motion analysis (TMA).

The flack array sonar can be applied with a sonar system that detects low-frequency sound by mounting two long passive arrays on the left and right sides of the submarine.

Figure 2:
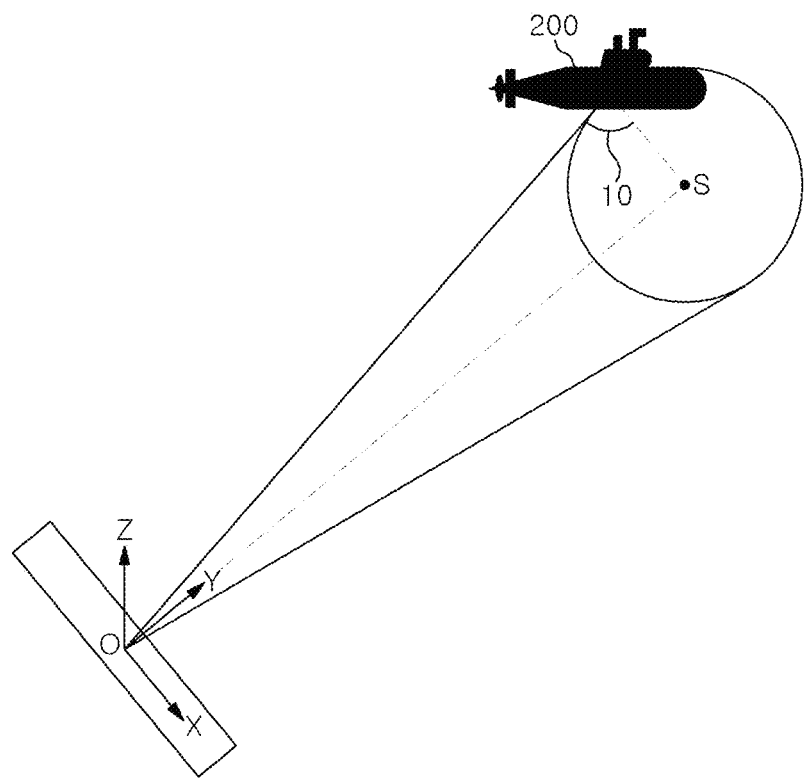
FIG. 2 is a three-dimensional representation of a conic angle between the three-dimensional target motion analysis apparatus and a target.

FIG. 2 is a three-dimensional representation of the conic angle between the three-dimensional target motion analysis apparatus and the target.

Referring to FIGS. 1 and 2, the three-dimensional coordinate system of the region detected by the detection unit 110 may be composed of x, y, and z axes with the center of the three-dimensional target motion analysis apparatus 100 as the origin O. Here, the x-axis may refer to the direction of the ship, and the z-axis may refer to the depth.

If the target 200 is detected by the detection unit 110 of FIG. 1, the target 200 is located on the surface of a cone having the detection unit 110 of FIG. 1 as a vertex. In this case, the conic angle 10 between the detection unit 110 and the target 200 may refer to an angle formed by a straight line connecting the origin O and the target 200 and a straight line connecting the target 200 and the center S of the circle.

Accordingly, if the detection unit 110 obtains the conic angle 10 with respect to the target 200, it may be determined that the target 200 is located on the surface of the cone with the detection unit 110 as the vertex of the cone.

Accordingly, the target motion analysis unit 120 of FIG. 1 to be described later, based on the conic angle 10 obtained by the detection unit 110, may estimate the position of the target 200 at each time based on the filter generated on the surface of cone in which the filter generator 140 to be described later satisfies the conic angle 10 at each time. In addition, the target motion analysis unit 120 may analyze the motion of the target by tracking the position of the target 200 at each time. A method of estimating the position of the target 200 and a detailed method of tracking the motion of the target by the target motion analysis unit 120 and will be described later.

The observability determination unit 130 may generate a state vector x based on the position of the target 200 estimated at each time point, and determine the observability of the target 200 using the generated state vector.

Here, the state vector x may be defined as Equation 1 below.

$$x = (p_x, p_y, p_z, v_x, v_y, v_z)^T \quad \text{[Equation 1]}$$

Here, px, py, and pz respectively denote x, y and z coordinates according to a relative position between the estimated position of the target 200 and the position of the detection unit 110, and vx vy and vz respectively denote relative velocities with respect to the x, y, and z axes between the target 200 and the detection unit 110. Accordingly, the state vector x may include information on the relative position and relative velocity information between the target 200 and the detection unit 110.

In this case, the relation between the state vector x of the target and the conic angle 10 h(x) may be expressed as Equation 2 below.

$$h(x) = \tan^{-1} \frac{p_x^B}{\sqrt{(p_y^B)^2 + (p_z^B)^2}} \quad \text{[Equation 2]}$$

Here, B denotes to a case in which the relative positional relationship between the target 200 and the detection unit 110 is expressed in the three-dimensional coordinates of the detection unit.

The observability determination unit 130 may calculate a Fisher Information Matrix (FIM) as shown in Equation 3 below by using Equations 1 and 2.

$$FIM = \sum_{i=0}^{k} \left( \frac{\partial h(x_i)}{\partial x_0} \right)^T \sigma_i^{-2} \left( \frac{\partial h(x_i)}{\partial x_0} \right) \quad \text{[Equation 3]}$$

Here, i denotes the time at which the target motion analysis unit 120 estimates the position of the target 200, $\sigma_i$ denotes the noise level of the detector 110, and x0 denotes an initial state vector. In addition, the Fisher Information Matrix (FIM) refers to the amount of information for each state vector between time 0 and time k, and $$\frac{\partial h(x_i)}{\partial x_0}$$

refers to a Jacobian matrix with respect to the state vector at time 0 of the conic angle at time i.

Since the state vector xi represents the relative position and relative velocity information between the target 200 and the detection unit 110, $$\frac{\partial h(x_i)}{\partial x_0}$$

may represent a partial derivative with respect to the relative position and the relative velocity between the target 200 and the detection unit 110. In this case, the position and the velocity of the target 200 may be the position and the velocity of the target 200 estimated by the target motion analysis unit 120, or the position and the velocity of the target 200 input by the user. Accordingly, the relative position and the relative velocity between the target 200 and the detection unit 110 may be determined by the attitude information sensed by the detection unit 110 and the estimated or inputted position and the velocity of the target 200.

Here, since the Fisher information matrix has a value of 0 if the position of the target 200 cannot be estimated, the observability determination unit 130 can determine whether the target 200 is observable using this property.

The observability determination unit 130 may determine whether the target 200 is observable by defining a determinant value of the calculated Fisher information matrix as the observability index J.

In more detail, if the observability index J is equal to or greater than a predetermined value $\epsilon$, the observability determination unit 130 may determine that the target 200 has the observability. That is, if the observability index J becomes greater than $\epsilon$ after the shifting of the detection unit 110, the observability determination unit 130 may determine that the three-dimensional target motion analysis apparatus 100 is observable.

Conversely, if the observability index J is smaller than the predetermined value $\epsilon$, the observability determination unit 130 may determine that the three-dimensional target motion analysis apparatus 100 is not observable.

In the above, the method of determining how the observability determination unit 130 determines the observability of the three-dimensional target motion analysis apparatus 100 has been described. Hereinafter, the method how the three-dimensional target motion analysis apparatus 100 tracks the position of the target 200 and analyzes the motion of the target will be described.

Referring back to FIG. 1, the filter generation unit 140 may generate a plurality of filters at uniform intervals on the surface of the region corresponding to the conic angle obtained by the detection unit 110 at a predetermined time point. Here, the region corresponding to the conic angle becomes a cone-shaped region with the detection unit 110 as a vertex. Also, the filter generation unit 140 may uniformly generate a filter for determining the position of the target on the surface of the region.

Figures 3A, 3B:
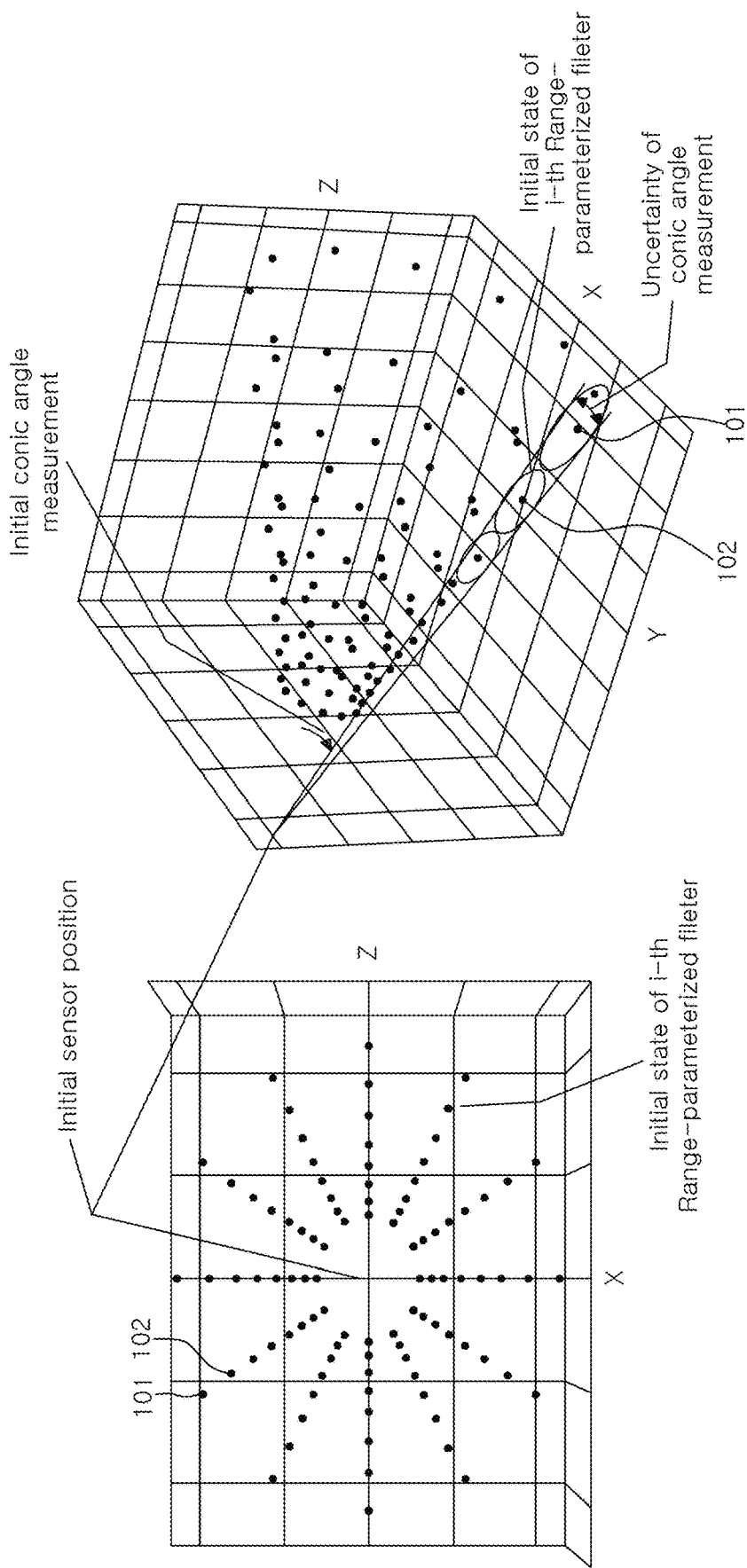
FIG. 3A shows a position of a filter generated using an initially detected conic angle in the XZ coordinate system.
FIG. 3B shows a position of the filter generated using the initially detected conic angle in the three-dimensional coordinate system.

FIG. 3A shows the position of the filter generated using the initially detected conic angle in the XZ coordinate system, and FIG. 3B shows the position of the filter generated using the initially detected conic angle in the three-dimensional coordinate system.

Referring to FIG. 3A, the filter generation unit 140 generates concentric circles at uniform intervals in the y-axis direction on the surface of the region corresponding to the conic angle, and generates a plurality of filters 101 and 102 on the generated concentric circles at an isometric angle from the origin O. Also, for each filter, the filter generation unit 140 may set different state vectors indicating the position and the velocity of the filter, and covariance which is a region in which the filter can detect the target. Here, the position of the filter may be set in a three-dimensional coordinate system of X, Y and Z.

Referring to FIG. 3B, for a plurality of filters generated by the filter generation unit 140, the size of the covariance, which is a region in which the filter can detect the target, may have a larger value as the distance from the origin where the three-dimensional target motion analysis apparatus 100 is located is larger. For example, the size of the covariance (elliptic region) of the first filter 102 that is close to the three-dimensional target motion analysis apparatus 100 may be set smaller than the size of the covariance (elliptical region) of the second filter 101 that is farther away from the apparatus 100. This is because the uncertainty of the position of the target due to the measurement noise of the detection unit 110 increases as the distance from the three-dimensional target motion analysis apparatus 100 increases.

The target motion analysis unit 120 may generate a track corresponding to the trajectory as a result of the three-dimensional motion analysis according to time. Here, the track generated by the target motion analysis unit 120 refers to a trajectory in which the position of the target is tracked according to each time. Therefore, since the track is not generated when the detection unit 110 first acquires the conic angle, the target motion analysis unit 120 then generates the track through the track initialization process.

The target motion analysis unit 120 may configure a plurality of filters in the form of a bank, and track the position of the target by using a sequential estimation technique with respect to the state vectors of the plurality of filters. The target motion analysis unit 120 may calculate an estimated representative value with a Gaussian mixture of the state vector for each time, and estimate the position of the target.

The target motion analysis unit 120 may calculate the first conic angle of each of the first filters according to Equation 2 based on the state vector of the first filter generated at the first predetermined time point. Then, the target motion analysis unit 120 may calculate the weight of the first filter based on the first filter, the first position estimated at the first time, and the Innovation matrix of the first filter, and update the first position based on the calculated weight. In addition, the target motion analysis unit 120 may track the motion of the target based on the updated first position and the second position of the target estimated at the second time point. Accordingly, the target motion analysis unit 120 may also calculate, estimate, or track the velocity of the target.

Here, after the target motion analysis unit 120 calculates the weights of the first filter, each weight may be normalized to track the motion of the target.

The weight ($w_{k,f}$) of the f-th filter of the target motion analysis unit 120 may be calculated as Equation 4 below by using the likelihood with the currently estimated position of the target.

$$p_{k,f} = N(z_k - h(x_{k,f}), S_{k,f})$$ [Equation 4]

$$w_{k,f} = \frac{p_{k,f}}{\sum_{g=1}^{N} p_{k,g}}$$

Here, N(m, $\sigma^2$) denotes a Gaussian probability distribution having an average m and a standard deviation σ, and zk denotes an estimated target position at time k. In addition, $S_{k,f}$ denotes an Innovation matrix of the f-th filter.

The tracking result display unit 150 may comprehensively display to the user the results of the target motion analyzed and determined by the target motion analysis unit 120 and the observability determination unit 130. The target motion result displayed by the tracking result display unit 150 may include whether or not the target is observable, a three-dimensional motion analysis result of the target, and the like.

Figure 4A:
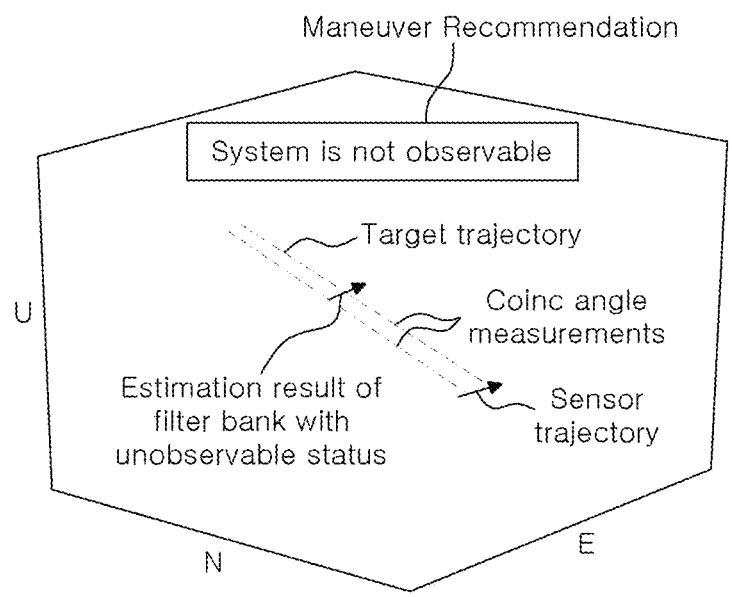
FIGS. 4A and 4B show whether or not the target analyzed by the three-dimensional target motion analysis method is observable.
Figure 4B:
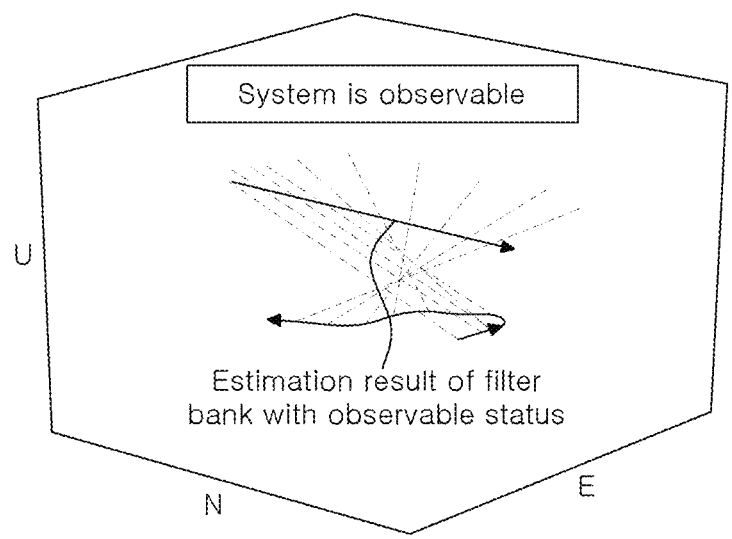

FIGS. 4A and 4B show whether or not the target analyzed by the three-dimensional target motion analysis method is observable.

Referring to FIG. 4A, the tracking result display unit 150 may display the tracking result of the target, and along with this, may display a message that the observability is lacking based on the observability determination result for the target by the observability determination unit 130.

If the above message is displayed, the user may modify the target motion tracking result by adjusting the moving direction of the ship because there is no observability with respect to the target motion tracking.

In addition, referring to FIG. 4B, the tracking result display unit 150 may display the tracking result of the target, and along with this, based on the observability determination result for the target by the observability determination unit 130, may display a message that there is the observability.

If the message is displayed, there is an effect that the user can more accurately plan an engagement based on the result of the target motion analysis because the user has the observability for the motion tracking of the target.

In addition, even if it is determined that there exists the observability with respect to the motion of the target, if it is determined that the three-dimensional target motion analysis result is divergent, the divergence result may be displayed together.

Figure 5:
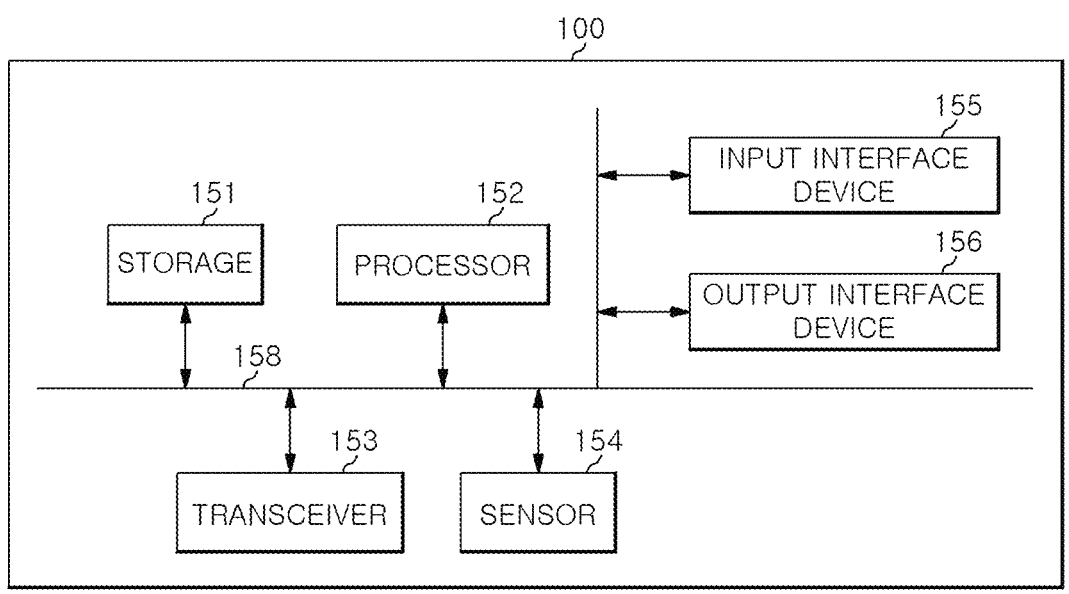
FIG. 5 is a block diagram for explaining the three-dimensional target motion analysis apparatus according to the embodiment of the present disclosure in terms of hardware.

FIG. 5 is a block diagram for explaining the three-dimensional target motion analysis apparatus according to the embodiment of the present disclosure in terms of hardware.

Referring to FIGS. 1 and 5, the three-dimensional target motion analysis apparatus 100 may include a storage 151 that stores at least one command, a processor 152 that executes at least one command of the storage 151, a transceiver 153, a sensor 154, an input interface device 155, and an output interface device 156.

Each of the components 151, 152, 153, 154, 155 and 156 included in the three-dimensional target motion analysis apparatus 100 may be connected by data bus 157 to perform communication with each other.

The storage 151 may include a memory or at least one of a volatile storage medium and a non-volatile storage medium. For example, the storage 151 may include at least one of a read only memory (ROM) and a random access memory (RAM).

The storage 151 may further include at least one command to be executed by the processor 152 to be described later, and may store a threshold value, a time interval, and the like of the observability index input from the user in the input interface device 155.

The processor 152 may refer to a central processing unit (CPU), a graphics processing unit (GPU), a micro controller unit (MCU), or a dedicated processor on which methods according to the embodiments of the present disclosure are performed.

Referring further to FIG. 1, as described above, the processor 152 may perform functions of the target motion analysis unit 120, the observability determination unit 130, and the filter generation unit 140 according to at least one program command stored in the storage 151, each of which may be stored in a memory in the form of at least one module and may be executed by the processor.

The transceiver 153 may receive or transmit data from an internal device or an external device connected through communication.

The sensor 154 may sense attitude information including the attitude angle, the position, and the depth of the three-dimensional target motion analysis apparatus 100 and the conic angle between the target and the three-dimensional target motion analysis apparatus 100, and may perform the functions of the detection unit 110 of FIG. 1.

The input interface device 155 may receive a threshold value, a time interval value, and the like of the observability index input by the user.

The output interface device 156 may output and visualize at least one information including whether the three-dimensional target is moved or observable by the operation of the processor 152.

Figure 6:
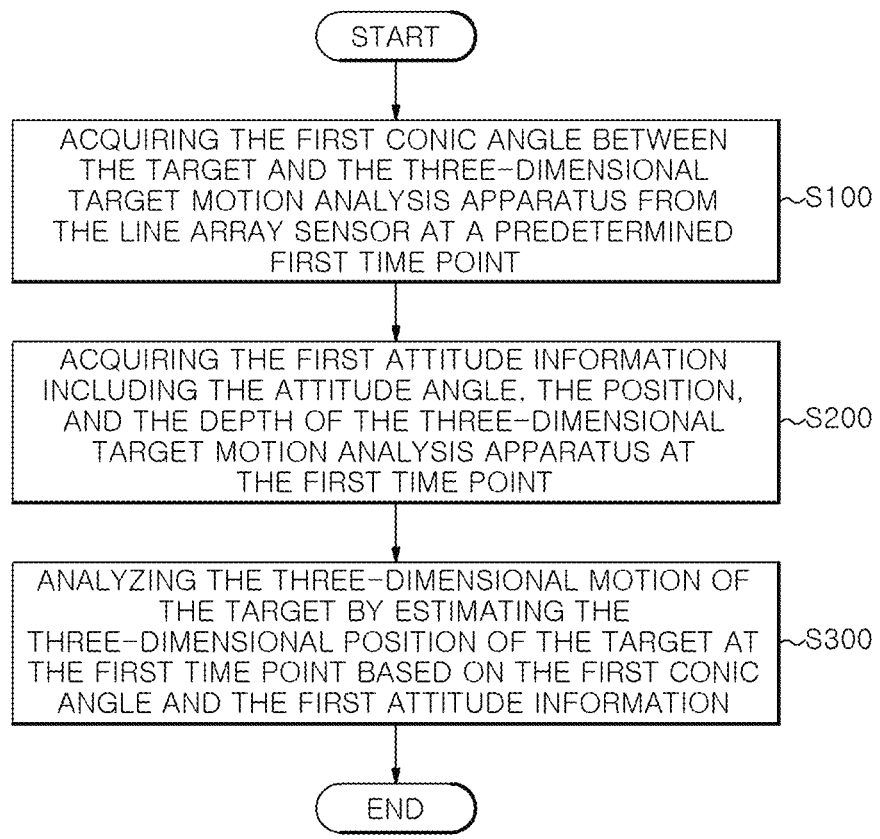
FIG. 6 is a flowchart of a three-dimensional target motion analysis method according to the embodiment of the present disclosure.

FIG. 6 is the flowchart of the three-dimensional target motion analysis method according to the embodiment of the present disclosure.

Referring to FIGS. 5 and 6, first, the sensor 154 may acquire a first conic angle between the target and the three-dimensional target motion analysis apparatus at a predetermined first time point from the line array sensor (S100).

Then, the sensor 154 may acquire a second conic angle between the target and the three-dimensional target motion analysis apparatus from the line array sensor at a second time point that is after a first time interval from the first time point (S200).

The processor 152 may analyze a motion of the target including at least one of the observability of the target and the three-dimensional motion tracking of the target based on the obtained first and second conic angles (S300).

Finally, the output interface device 156 may display a result of the motion analysis of the target.

Each flowcharts of the present disclosure can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each step in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

That is, the above-described embodiments of the present disclosure may be implemented in form of a computer-readable storage medium storing a computer program programmed to perform each step included in the method or the computer program, stored in the computer-readable storage medium, programmed to perform each step included in the method.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A three-dimensional target motion analysis method using a line array sensor performed by a three-dimensional target motion analysis apparatus on a ship, the method comprising:
    detecting, using the line array sensor, a first three-dimensional region where a target is located;
    defining a three-dimensional coordinate system of the detected first three-dimensional region, wherein the three-dimensional coordinate system includes x, y, and z axes with a center of the three-dimensional target motion analysis apparatus as an origin, wherein the x-axis represents a moving direction of the ship, wherein the y-axis represents a direction to generate concentric circles where a plurality of filters are positioned, and wherein the z-axis represents a direction of a depth of the three-dimensional target motion analysis apparatus;
    acquiring a first conic angle between the target and the three-dimensional target motion analysis apparatus from the line array sensor at a predetermined first time point;
    acquiring first attitude information including an attitude angle, a position, and the depth of the three-dimensional target motion analysis apparatus at the first time point; and
    analyzing a three-dimensional motion of the target by estimating a three-dimensional position of the target at the first time point based on the first conic angle and the first attitude information, wherein analyzing the three-dimensional motion of the target includes:
generating a first filter on a surface of the first three-dimensional region corresponding to the obtained first conic angle,
with respect to the generated first filter, setting different state vectors indicating a position and a velocity of the first filter using the first attitude information, and
estimating a first position, which is a position of the target at the first time point, based on the state vectors of the first filter;
determining an observability of the target based on the state vectors; and
displaying a message reflecting the determined observability so as to enable a user to adjust the moving direction of the ship based at least in part on the message.

2. The method of claim 1, wherein the estimating of the first position comprises:
estimating the first position with a Gaussian mixture with respect to the state vectors of the first filter.

3. The method of claim 1, further comprising:
acquiring a second conic angle between the target and the three-dimensional target motion analysis apparatus from the line array sensor at a second time point after a predetermined time interval from the first time point;
acquiring second attitude infoiniation of the three-dimensional target motion analysis apparatus at the second time point; and
updating the motion of the target and the state vectors of the first filter based on the first position, the second conic angle and the second attitude information.

4. The method of claim 3, wherein the updating of the state vectors of the first filter includes:
updating the state vectors by using the first position, the second conic angle and the second attitude information as inputs of a Kalman filter.

5. The method of claim 1, wherein setting different state vectors includes:
with respect to the generated first filter, setting a covariance which is a region in which the first filter can detect the target using the first attitude information,
wherein at the first time point, the covariance of the first filter is set to increase in size as a distance from the line array sensor increases.

6. The method of claim 1, wherein the analyzing of the three-dimensional motion of the target includes:
calculating the first conic angle of the first filter based on the, state vectors of the first filter;
calculating a weight of the first filter based on the first filter, the estimated first position, and an innovation matrix of the first filter;
updating the first position based on the calculated weight; and
tracking the motion of the target based on the updated first position.

7. The method of claim 6, wherein the calculating of the weight of the first filter includes normalizing the weight.

8. A non-transitory computer-readable storage medium including computer executable instructions, wherein the instructions, when executed by a processor, cause the processor to perform the three-dimensional target motion analysis method of claim 1.

9. The method of claim 1, wherein each of the state vectors (x) is defined as Equation 1, $$x=(p_x, p_y, p_z, v_x, v_y, v_z)^T,$$ [Equation 1]

Wherein:
$p_x, p_y$, and $p_z$ respectively denote x, y and z coordinates according to a relative position between the estimated position of the target and the position of the line array sensor,
$v_x, v_y$, and $v_z$ respectively denote relative velocities with respect to the x, y, and z axes between the target and the line array sensor, and
the state vector (x) has information on the relative position and relative velocity information between the target and the line array sensor.

10. The method of claim 9, wherein the relation between the state vector (x) of the target and the conic angle (h(x)) is expressed as Equation 2, $$h(x) = \tan^{-1}\frac{p_x^B}{\sqrt{(p_y^B)^2 + (p_z^B)^2}},$$ [Equation 2]

wherein:
B denotes to a case in which the relative positional relationship between the target and the line array sensor is expressed in the three-dimensional coordinate of the line array sensor.

11. The method of claim 10, wherein determining the observability of the target includes:
calculating a Fisher Information Matrix (FIM) using Equation 3, $$FIM = \sum_{i=0}^{k}\left(\frac{\partial h(x_i)}{\partial x_0}\right)^T \sigma_i^{-2}\left(\frac{\partial h(x_i)}{\partial x_0}\right),$$ [Equation 3]

Wherein:
i denotes the time at which the position of the target is estimated,
σ denotes a noise level of the line array sensor,
$x_0$ denotes an initial state vector,
the Fisher Information Matrix (FIM) represents the amount of information for each state vector between time 0 and time k, and $$\frac{\partial h(x_i)}{\partial x_n}$$

represents a Jacobian matrix with respect to the state vector at time 0 of the a conic angle at time i.

12. A three-dimensional target motion analysis method using a line array sensor performed by a three-dimensional target motion analysis apparatus on a ship, the method comprising:
detecting, using the line array sensor, a first three-dimensional region where a target is located;
defining a three-dimensional coordinate system of the detected first three-dimensional region, wherein the three-dimensional coordinate system includes x, y, and z axes with a center of the three-dimensional target motion analysis apparatus as an origin, wherein the x-axis represents a moving direction of the ship, wherein the y-axis represents a direction to generate concentric circles where a plurality of filters are positioned, and wherein the z-axis represents a direction of a depth of the three-dimensional target motion analysis apparatus;

acquiring a first conic angle between the target and the three-dimensional target motion analysis apparatus from the line array sensor at a predetermined first time point;

acquiring first attitude information including an attitude angle, a position, and the depth of the three-dimensional target motion analysis apparatus at the first time point;

analyzing a three-dimensional motion of the target by estimating a three-dimensional position of the target at the first time point based on the first conic angle and the first attitude information;

estimating the position of the target at a second time point that is after a first predeteniiined time interval from the first time point, which is performed after the analyzing of the three-dimensional motion of the target by estimating the three-dimensional position of the target;

calculating a first estimated conic angle and a second estimated conic angle respectively, based on the first estimated position of the target at the first time point and the second position of the target at the second time point, or based on the first estimated position and the second estimated position input by a user;

determining an observability of the target based on the first estimated conic angle and the second estimated conic angle; and displaying a message reflecting the determined observability so as to enable a user to adjust the moving direction of the target based at least in part on the message.

13. The method of claim 12, wherein the determining of the observability includes:

calculating an observability index based on the first estimated conic angle and the second estimated conic angle; and determining that there is the observability of the target if the observability index is equal to or greater than a predetermined value.

14. A three-dimensional target motion analysis apparatus on a ship using a line array sensor, comprising:

a detection device configured to acquire a first conic angle between a target and the three-dimensional target motion analysis apparatus from the line array sensor at a predetermined first time point, and acquire first attitude information including an attitude angle, a position, and a depth of the three-dimensional target motion analysis apparatus at the first time point, the detection device further configured to detect a first three-dimensional region where the target is located; and a controller configured to:

analyze a three-dimensional motion of the target by estimating a three-dimensional position of the target at the first time point based on the first conic angle and the first attitude information, define a three-dimensional coordinate system of the detected first three-dimensional region, wherein the three-dimensional coordinate system includes x, y, and z axes with a center of the three-dimensional target motion analysis apparatus as an origin, wherein the x-axis represents a moving direction of the ship, wherein the y-axis represents a direction to generate concentric circles where a plurality of filters are positioned, and wherein the z-axis represents a direction of a depth of the three-dimensional target motion analysis apparatus, generate a first filter on a surface of the first three-dimensional region corresponding to the obtained first conic angle, with respect to the generated first filter, set different state vectors indicating a position and a velocity of the first filter using the first attitude information, estimate a first position, which is a position of the target at the first time point, based on the state vectors of the first filter, determine an observability of the target based on the state vectors, and display a message reflecting the determined observability so as to enable a user to adjust the moving direction of the ship based at least in part on the message.

* * * * *